United States Patent
Kim et al.

(10) Patent No.: US 12,322,359 B2
(45) Date of Patent: Jun. 3, 2025

(54) SIGNAL PROCESSING DEVICE AND IMAGE DISPLAY APPARATUS INCLUDING THE SAME CAPABLE OF INCREASING CLARITY OF OSD WHEN MIXING WITH IMAGE

(71) Applicant: LG ELECTRONICS INC., Seoul (KR)

(72) Inventors: Changhyun Kim, Seoul (KR); Jeonghyu Yang, Seoul (KR); Jungeun Lim, Seoul (KR); Junseong Kim, Seoul (KR); Sunguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 17/782,854

(22) PCT Filed: Dec. 6, 2019

(86) PCT No.: PCT/KR2019/017179
§ 371 (c)(1),
(2) Date: Jun. 6, 2022

(87) PCT Pub. No.: WO2021/112306
PCT Pub. Date: Jun. 10, 2021

(65) Prior Publication Data
US 2023/0005452 A1    Jan. 5, 2023

(51) Int. Cl.
*G09G 5/14* (2006.01)
*G06T 3/40* (2006.01)

(52) U.S. Cl.
CPC ............... *G09G 5/14* (2013.01); *G06T 3/40* (2013.01); *G09G 2340/0407* (2013.01); *G09G 2340/10* (2013.01)

(58) Field of Classification Search
CPC ............ G09G 5/14; G09G 2340/0407; G09G 2340/10; G06T 3/40
See application file for complete search history.

(56) References Cited

U.S. PATENT DOCUMENTS

| | | | |
|---|---|---|---|
| 2006/0092188 A1* | 5/2006 | Mamba | G09G 5/005 345/698 |
| 2018/0270448 A1* | 9/2018 | Onuma | H04N 7/18 |

FOREIGN PATENT DOCUMENTS

| | | |
|---|---|---|
| JP | 2018-157335 A | 10/2018 |
| KR | 10-1422013 B1 | 7/2014 |
| KR | 10-1661973 B1 | 10/2016 |
| KR | 101728077 B1 * | 4/2017 |
| KR | 10-2019-0109204 A | 9/2019 |

* cited by examiner

*Primary Examiner* — Michelle L Sams
(74) *Attorney, Agent, or Firm* — Birch, Stewart, Kolasch & Birch, LLP

(57) ABSTRACT

Provided are a signal processing device and an image display apparatus including the same. The signal processing device and the image display apparatus including the same include: a signal processor 170a may include an OSC processor configured to upscale an OSC having a first resolution to a second resolution greater than the first resolution; and a synthesizer configured to synthesize at least a part of an image having the second resolution and the upscaled OSD having the second resolution, and the OSD processor outputs the OSD having the second resolution, in which luminance and transparency are adjusted.

18 Claims, 17 Drawing Sheets

FIG. 8B

| conv | = | conv | bn | relu | | | |
|---|---|---|---|---|---|---|---|
| conv fc | = | conv dw | bn | relu | conv pw | bn | relu |
| fc | = | fc | bn | relu | | | |

(a)

(b)

(c)

(a)          (b)          (c)

SIGNAL PROCESSING DEVICE AND IMAGE DISPLAY APPARATUS INCLUDING THE SAME CAPABLE OF INCREASING CLARITY OF OSD WHEN MIXING WITH IMAGE

CROSS REFERENCE TO RELATED APPLICATIONS

This application is the National Phase of PCT International Application No. PCT/KR2019/017179, filed on Dec. 6, 2019, all of which is hereby expressly incorporated by reference into the present application.

BACKGROUND

1. Field

The present disclosure relates to a signal processing device and an image display apparatus including the same, and more particularly, a signal processing device capable of stably improving resolution even when input images of various resolutions are input, and an image display apparatus including the same.

2. Related Art

The signal processing device is a device that performs signal processing on an input image so that an image may be displayed.

For example, the signal processing device may receive images of various resolutions through an external device or an external server and may perform signal processing thereon.

Meanwhile, in recent years, with the increase in resource of the input image, when an OSD and the input image are displayed jointly, a case where degradation of an image quality in an OSD area occurs has frequently happened.

SUMMARY

An object of the present disclosure is to provide a signal processing device and an image display apparatus including the same capable of increasing a clarity of an OSD when mixing with an image.

Another object of the present disclosure is to provide a signal processing device and an image display apparatus including the same capable of increasing the clarity of the OSD and reducing noise when mixing with the image while increasing a resolution of the OSD.

Yet another object of the present disclosure is to provide a signal processing device and an image display apparatus including the same capable of increasing the clarity of the OSD and reducing the noise when mixing with the image while increasing the resolution of the OSD by using a deep neural network.

In an aspect of the present disclosure, a signal processing device and an image display apparatus including the same include: an OSC processor configured to upscale an OSC having a first resolution to a second resolution greater than the first resolution; and a synthesizer configured to synthesize at least a part of an image having the second resolution and the upscaled OSD having the second resolution, and the OSD processor outputs the OSD having the second resolution, in which luminance and transparency are adjusted.

Meanwhile, in another aspect of the present disclosure, a signal processing device and an image display apparatus including the same include: an OSC processor configured to upscale an OSD having a first resolution to a second resolution greater than the first resolution; and a synthesizer configured to synthesize at least a part of an image having the second resolution and the upscaled OSD having the second resolution, and the OSD processor outputs the OSD having the second resolution, in which a blending ratio of the image and the OSD, and luminance are adjusted.

Advantageous Effects

The signal processing device and the image display apparatus including the same include: an OSC processor configured to upscale an OSC having a first resolution to a second resolution greater than the first resolution; and a synthesizer configured to synthesize at least a part of an image having the second resolution and the upscaled OSD having the second resolution, and the OSD processor outputs the OSD having the second resolution, in which luminance and transparency are adjusted. As a result, while the resolution of the OSD is increased, the clarity of the OSD may be increased and the noise may be reduced when mixing with the image.

Meanwhile, the OSD processor may control the luminance and the transparency of the OSD having the second resolution to be greater than the luminance and the transparency of the OSD having the first resolution after upscaling the OSD having the first resolution to the second resolution. As a result, while the resolution of the OSD is increased, the clarity of the OSD may be increased and the noise may be reduced when mixing with the image.

Meanwhile, the OSD processor may control change amounts of the luminance and the transparency of the OSD having the second resolution to further increase as a difference between the first resolution and the second resolution increases. As such, the change amounts of the luminance and the transparency are changed according to the difference between the first resolution and the second resolution to increase the clarity of the OSD and reduce the noise when mixing with the image.

Meanwhile, the OSD processor may be configured to increase the transparency of the OSD having the second resolution as the luminance of the image increases and decrease the transparency of the OSD having the second resolution as the luminance of the image decreases. As such, the transparency is adjusted according to the luminance of the image to increase the clarity of the OSD and reduce the noise when mixing with the image.

Meanwhile, the OSD processor may be configured to increase sharpness of the transparency of the OSD having the second resolution. As such, the sharpness of the transparency is adjusted to increase the clarity of the OSD and reduce the noise when mixing with the image.

Meanwhile, the OSD processor may be configured to increase the luminance and the sharpness of the transparency of the OSD having the second resolution. As such, the sharpness of the transparency is adjusted to increase the clarity of the OSD and reduce the noise when mixing with the image.

Meanwhile, the OSD processor may be configured to increase change amounts of the luminance and the sharpness of the transparency of the OSD having the second resolution as the luminance of the image increases and decrease the change amounts of the luminance and the sharpness of the transparency of the OSD having the second resolution as the luminance of the image decreases. As a result, while the resolution of the OSD is increased, the clarity of the OSD may be increased and the noise may be reduced when mixing with the image.

Meanwhile, the OSD processor may output the OSD having the second resolution, in which a color is further adjusted. As a result, while the resolution of the OSD is increased, the clarity of the OSD may be increased and the noise may be reduced when mixing with the image.

Meanwhile, the OSD processor may control a level of the color of the OSD having the second resolution to be greater than the level of the color of the OSD having the first resolution after upscaling the OSD having the first resolution to the second resolution. As a result, while the resolution of the OSD is increased, the clarity of the OSD may be increased and the noise may be reduced when mixing with the image.

Meanwhile, the signal processor may include a first resolution processor configured to change the luminance of the OSD having the first resolution to the luminance of the OSD having the second resolution, a second resolution processor configured to change the transparency of the OSD having the first resolution to the luminance of the OSD having the second resolution, and a third resolution processor configured to change a color of the OSD having the first resolution to the color of the OSD having the second resolution. As a result, while the resolution of the OSD is increased, the clarity of the OSD may be increased and the noise may be reduced when mixing with the image.

Meanwhile, the signal processor may include a learning processor configured to change the luminance of the OSD having the first resolution to the luminance of the OSD having the second resolution, and change the transparency of the OSD having the first resolution to the transparency of the OSD having the second resolution, based on learning a deep neural network, and a resolution processor configured to change the color of the OSD having the first resolution to the color of the OSD having the second resolution. As a result, while the resolution of the OSD is increased, the clarity of the OSD may be increased and the noise may be reduced when mixing with the image.

Meanwhile, in another aspect of the present disclosure, a signal processing device and an image display apparatus including the same include: an OSC processor configured to upscale an OSD having a first resolution to a second resolution greater than the first resolution; and a synthesizer configured to synthesize at least a part of an image having the second resolution and the upscaled OSD having the second resolution, and the OSD processor outputs the OSD having the second resolution, in which a blending ratio of the image and the OSD, and luminance are adjusted. As a result, while the resolution of the OSD is increased, the clarity of the OSD may be increased and the noise may be reduced when mixing with the image.

Meanwhile, the OSD processor may control the luminance and the blending ratio of the OSD having the second resolution to be greater than the luminance and the blending ratio of the OSD having the first resolution after upscaling the OSD having the first resolution to the second resolution. As a result, while the resolution of the OSD is increased, the clarity of the OSD may be increased and the noise may be reduced when mixing with the image.

Meanwhile, the OSD processor may control change amounts of the luminance and the blending ratio of the OSD having the second resolution to further increase as a difference between the first resolution and the second resolution increases. As a result, while the resolution of the OSD is increased, the clarity of the OSD may be increased and the noise may be reduced when mixing with the image. As such, the change amounts of the luminance and the blending ratio are changed according to the difference between the first resolution and the second resolution to increase the clarity of the OSD and reduce the noise when mixing with the image.

Meanwhile, the OSD processor may be configured to increase the blending ratio of the OSD having the second resolution as the luminance of the image increases and control the blending ratio of the OSD having the second resolution to decrease as the luminance of the image decreases. As a result, while the resolution of the OSD is increased, the clarity of the OSD may be increased and the noise may be reduced when mixing with the image. As such, the blending ratio is adjusted according to the luminance of the image to increase the clarity of the OSD and reduce the noise when mixing with the image.

Meanwhile, the OSD processor may be configured to increase sharpness of the blending ratio of the OSD having the second resolution. As such, the clarity of the OSD may be increased and the noise may be reduced when mixing with the image according to the blending ratio.

Meanwhile, the OSD processor may be configured to increase change amounts of the luminance and the sharpness of the blending ratio of the OSD having the second resolution as the luminance of the image increases and decrease the change amounts of the luminance and the sharpness of the blending ratio of the OSD having the second resolution as the luminance of the image decreases. As a result, while the resolution of the OSD is increased, the clarity of the OSD may be increased and the noise may be reduced when mixing with the image.

Meanwhile, the OSD processor may output the OSD having the second resolution, in which a color is further adjusted. As a result, while the resolution of the OSD is increased, the clarity of the OSD may be increased and the noise may be reduced when mixing with the image.

Meanwhile, the OSD processor may control a level of the color of the OSD having the second resolution to be greater than the level of the color of the OSD having the first resolution after upscaling the OSD having the first resolution to the second resolution. As a result, while the resolution of the OSD is increased, the clarity of the OSD may be increased and the noise may be reduced when mixing with the image.

Meanwhile, the signal processor may include a first resolution processor configured to change the luminance of the OSD having the first resolution to the luminance of the OSD having the second resolution, a second resolution processor configured to change the blending ratio of the OSD having the first resolution to the blending ratio of the OSD having the second resolution, and a third resolution processor configured to change the color of the OSD having the first resolution to the color of the OSD having the second resolution. As a result, while the resolution of the OSD is increased, the clarity of the OSD may be increased and the noise may be reduced when mixing with the image.

BRIEF DESCRIPTION OF THE DRAWINGS

FIGS. 8A to 8B are views referenced for illustrating an operation of the signal processor of FIG. 7;

DESCRIPTION OF EMBODIMENTS

Hereinafter, the present disclosure will be described in more detail with reference to the drawings.

The suffixes "module" and "unit" for the constituent elements used in the following description are given in consideration of only the ease of preparation of the present disclosure and do not impart a particularly important meaning or role by themselves. Accordingly, the "module" and "unit" may be used interchangeably with each other.

Figure 1:
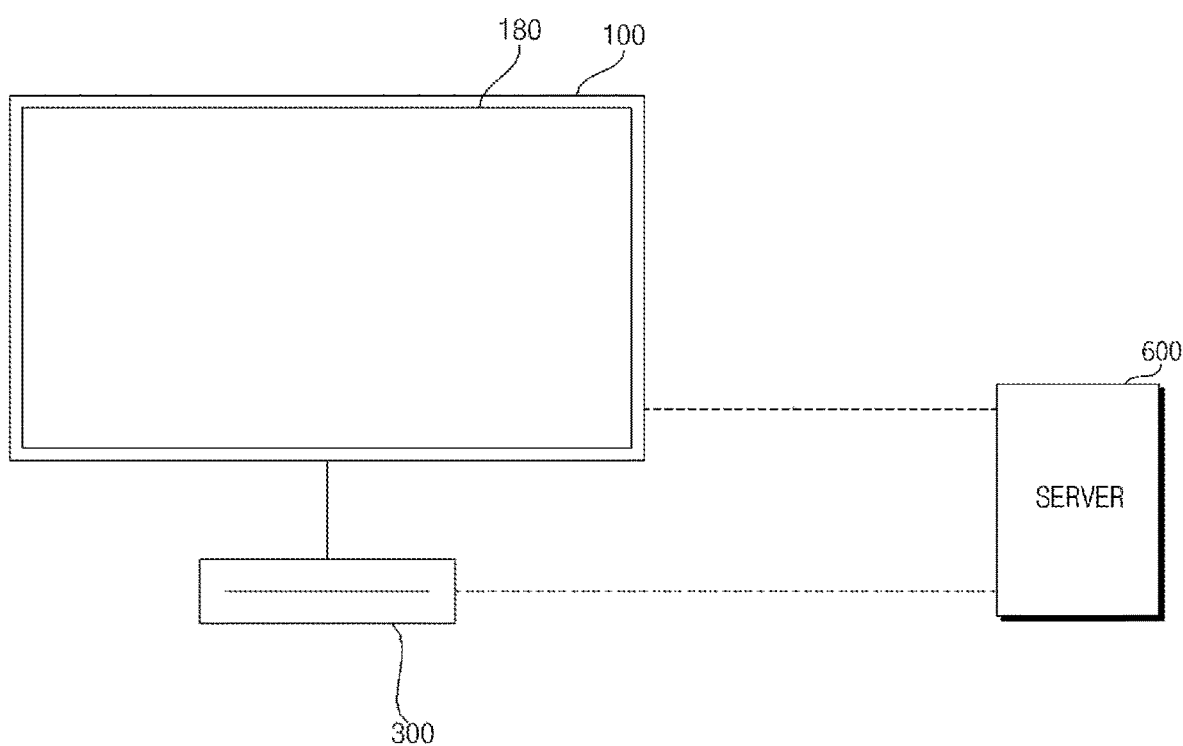
FIG. 1 illustrates an image display system according to an embodiment of the present disclosure.

FIG. 1 illustrates an image display system according to an embodiment of the present disclosure.

Referring to FIG. 1, an image display system 10 according to an embodiment of the present disclosure may include an image display apparatus 100 having a display 180, a set-top box 300, and a server 600.

The image display apparatus 100 according to an embodiment of the present disclosure may receive an image from the set-top box 300 or the server 600.

For example, the image display apparatus 100 may receive an image signal from the set-top box 300 through an HDMI terminal.

As another example, the image display apparatus 100 may receive an image signal from the server 600 through a network terminal.

Meanwhile, the image display apparatus 100 may receive input images of various resolutions through an external set-top box 300 or a network.

Meanwhile, the image display apparatus 100 according to an embodiment of the present disclosure upscales the resolution of the OSD to the resolution of the input image and synthesizes at least a part of the input image and the upscaled OSD, however, synthesizes the upscaled OSD of which luminance and transparency are adjusted with the at least a part of the input image when the resolution of the input image and the resolution of the OSD are different from each other. As a result, while the resolution of the OSD is increased, the clarity of the OSD may be increased and noise may be reduced when mixing with the image.

Meanwhile, the image display apparatus 100 according to another embodiment of the present disclosure upscales the resolution of the OSD to the resolution of the input image and synthesizes at least a part of the input image and the upscaled OSD, however, synthesizes the upscaled OSD in which a blending ratio of the image and the OSD is adjusted with the at least a part of the input image when the resolution of the input image and the resolution of the OSD are different from each other. As a result, while the resolution of the OSD is increased, the clarity of the OSD may be increased and the noise may be reduced when mixing with the image.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

In the present invention, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that the signal processor 170 (see FIG. 2) of the image display apparatus 100 performs image quality processing for the OLED panel. Meanwhile, the signal processor may be called a signal processing device. Hereinafter, the signal processing device and the signal processor are used to have the same meaning.

Meanwhile, the image display apparatus 100 in FIG. 1 may be a TV, a monitor, a tablet PC, a mobile terminal, a display for a vehicle, etc.

Figure 2:
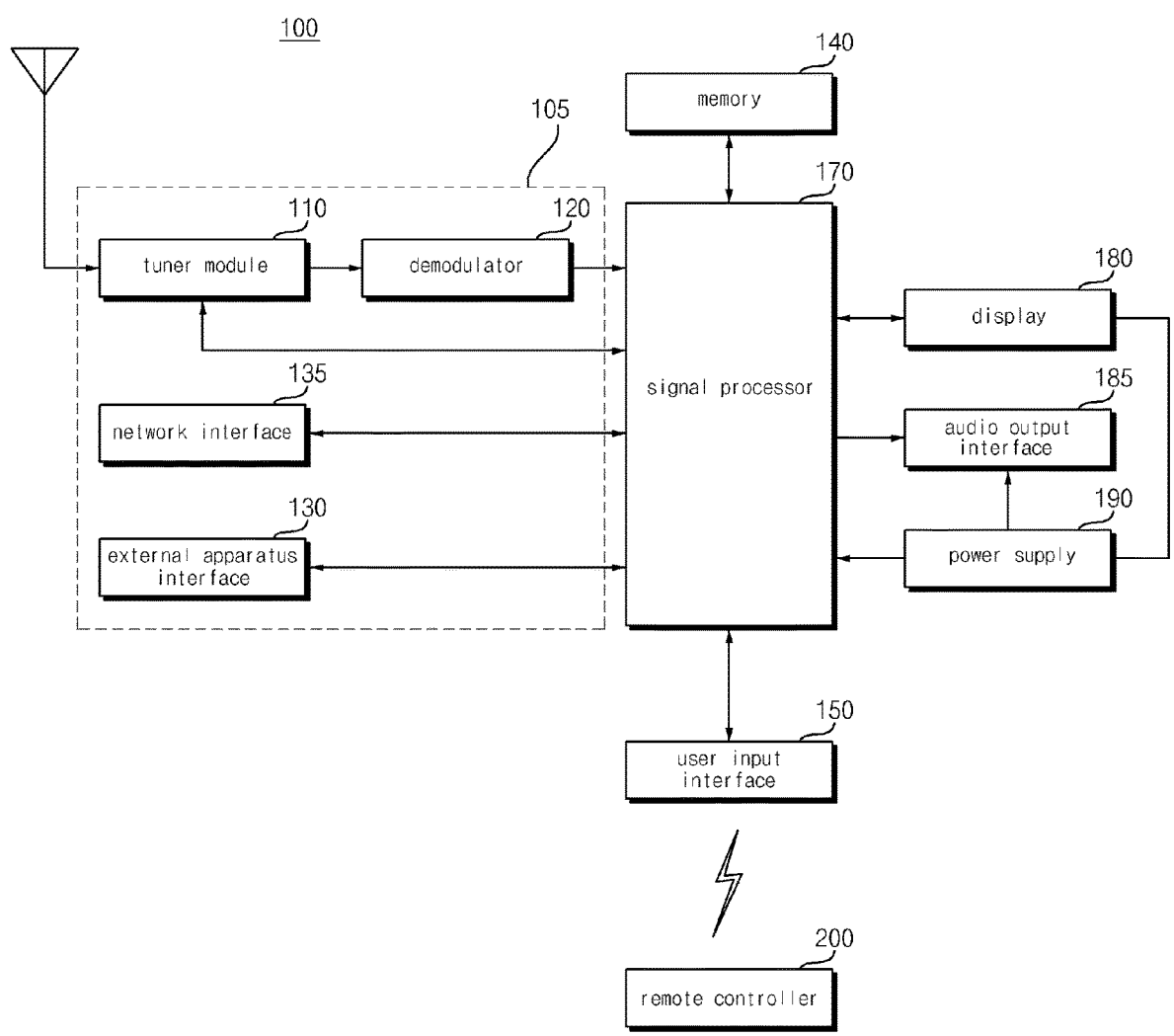
FIG. 2 is an example of an internal block diagram of an image display apparatus of FIG. 1.

FIG. 2 is an example of an internal block diagram of the image display apparatus of FIG. 1.

Referring to FIG. 2, the image display apparatus 100 according to an embodiment of the present invention includes a broadcast receiver 105, a memory 140, a user input interface 150, a sensor module (not shown), a signal processor 170, a display 180, and an audio output interface 185.

The signal processor 170 in the drawing may correspond to the signal processing device described above.

The broadcast receiver 105 may include a tuner module 110, a demodulator 120, a network interface 135, and an external apparatus interface 130.

Meanwhile, unlike the drawing, the broadcast receiver 105 may include only the tuner module 110, the demodulator 120, and the external apparatus interface 130. That is, the network interface 135 may not be included.

The tuner module 110 selects an RF broadcast signal corresponding to a channel selected by a user or all prestored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 can process a digital broadcast signal or an analog broadcast signal. The analog baseband image or audio signal (CVBS/SIF) output from the tuner module 110 may be directly input to the signal processor 170.

Meanwhile, the tuner module 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. Here, the stream signal may be a multiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output interface 185.

The external apparatus interface 130 may transmit or receive data with a connected external apparatus (not shown), e.g., a set-top box 50. To this end, the external apparatus interface 130 may include an A/V input and output interface (not shown).

The external apparatus interface 130 may be connected in wired or wirelessly to an external apparatus such as a digital versatile disk (DVD), a Blu ray, a game equipment, a camera, a camcorder, a computer(note book), and a set-top box, and may perform an input/output operation with an external apparatus.

The A/V input and output interface may receive image and audio signals from an external apparatus. Meanwhile, a wireless transceiver (not shown) may perform short-range wireless communication with other electronic apparatus.

Through the wireless transceiver (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless transceiver (not shown).

The memory 140 may store a program for each signal processing and control in the signal processor 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present invention is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor module (not shown) that senses a user's gesture to the signal processor 170, or may transmit a signal from the signal processor 170 to the sensor module (not shown).

The signal processor 170 may demultiplex the input stream through the tuner module 110, the demodulator 120, the network interface 135, or the external apparatus interface 130, or process the demultiplexed signals to generate and output a signal for image or audio output.

For example, the signal processor 170 may receive a broadcast signal or HDMI signal received by the broadcast receiver 105, and perform signal processing based on the received broadcast signal or HDMI signal to thereby output a processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output interface 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 is capable of performing a variety of signal processing, and, for this reason, the signal processor 170 may be implemented in the form of System On Chip (SOC). This will be described later with reference to FIG. 3.

In addition, the signal processor 170 can control the overall operation of the image display apparatus 100. For example, the signal processor 170 may control the tuner module 110 to control the tuning of the RF broadcast corresponding to the channel selected by the user or the previously stored channel.

In addition, the signal processor 170 may control the image display apparatus 100 according to a user command input through the user input interface 150 or an internal program.

Meanwhile, the signal processor 170 may control the display 180 to display an image. Here, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, or a text.

Meanwhile, the signal processor 170 may recognize the position of the user based on the image photographed by a photographing device (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170 or an input image, a data signal, a control signal, and the like in the external device interface 130.

Meanwhile, the display 180 may be configured as a touch screen and used as an input device in addition to an output device.

The audio output interface 185 receives a signal processed by the signal processor 170 and outputs it as an audio.

The photographing device (not shown) photographs a user. The photographing device (not shown) may be implemented by a single camera, but the present invention is not limited thereto and may be implemented by a plurality of cameras. Image information photographed by the photographing device (not shown) may be input to the signal processor 170.

The signal processor 170 may sense a gesture of the user based on each of the images photographed by the photographing device (not shown), the signals detected from the sensor module (not shown), or a combination thereof.

The power supply 190 supplies corresponding power to the image display apparatus 100. Particularly, the power supply 190 may supply the power to the signal processor 170 which can be implemented in the form of SOC, the display 180 for displaying an image, and an audio output interface 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present invention. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present invention, and specific operation and apparatus do not limit the scope of the present invention.

Figure 3:
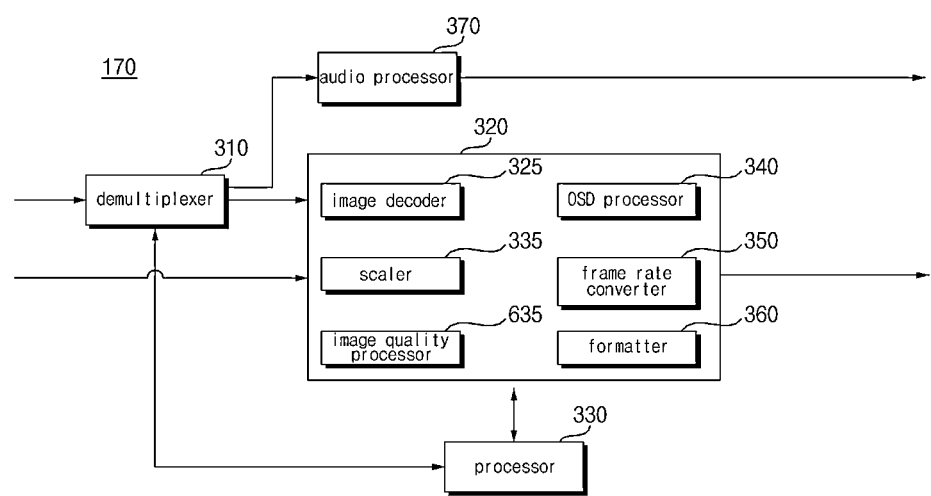
FIG. 3 is an example of an internal block diagram of a signal processor of FIG. 2.

FIG. 3 is an example of an internal block diagram of a signal processor shown in FIG. 2.

Referring to the drawing, the signal processor 170 according to an embodiment of the present invention may include a demultiplexer 310, an image processor 320, a processor 330, and an audio processor 370. In addition, it may further include a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner module 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of gray level of the input image signal, perform image resolution enhancement, perform high dynamic range (HDR)-based signal processing, change a frame rate, perform image quality processing appropriate for properties of a panel, especially an OLED panel, etc.

The OSD processor 340 generates an OSD signal according to a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The frame rate converter (FRC) 350 may convert the frame rate of an input image. Meanwhile, the frame rate converter 350 can also directly output the frame rate without any additional frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processor 170.

For example, the processor 330 may control the tuner module 110 to control the tuning of an RF broadcast corresponding to a channel selected by a user or a previously stored channel.

In addition, the processor 330 may control the image display apparatus 100 according to a user command input through the user input interface 150 or an internal program.

In addition, the processor 330 may transmit data to the network interface 135 or to the external apparatus interface 130

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present invention. Each component of the block diagram may be integrated, added, or omitted according to a specification of the signal processor 170 actually implemented.

In particular, the frame rate converter 350 and the formatter 360 may be provided separately from the image processor 320.

Figure 4A:
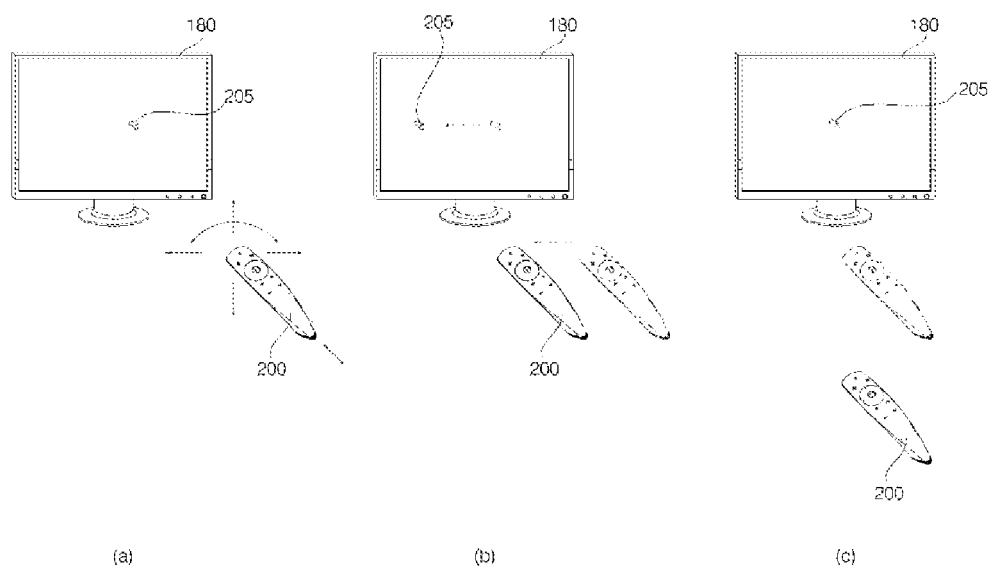
FIG. 4A illustrates a control method of a remote control device of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
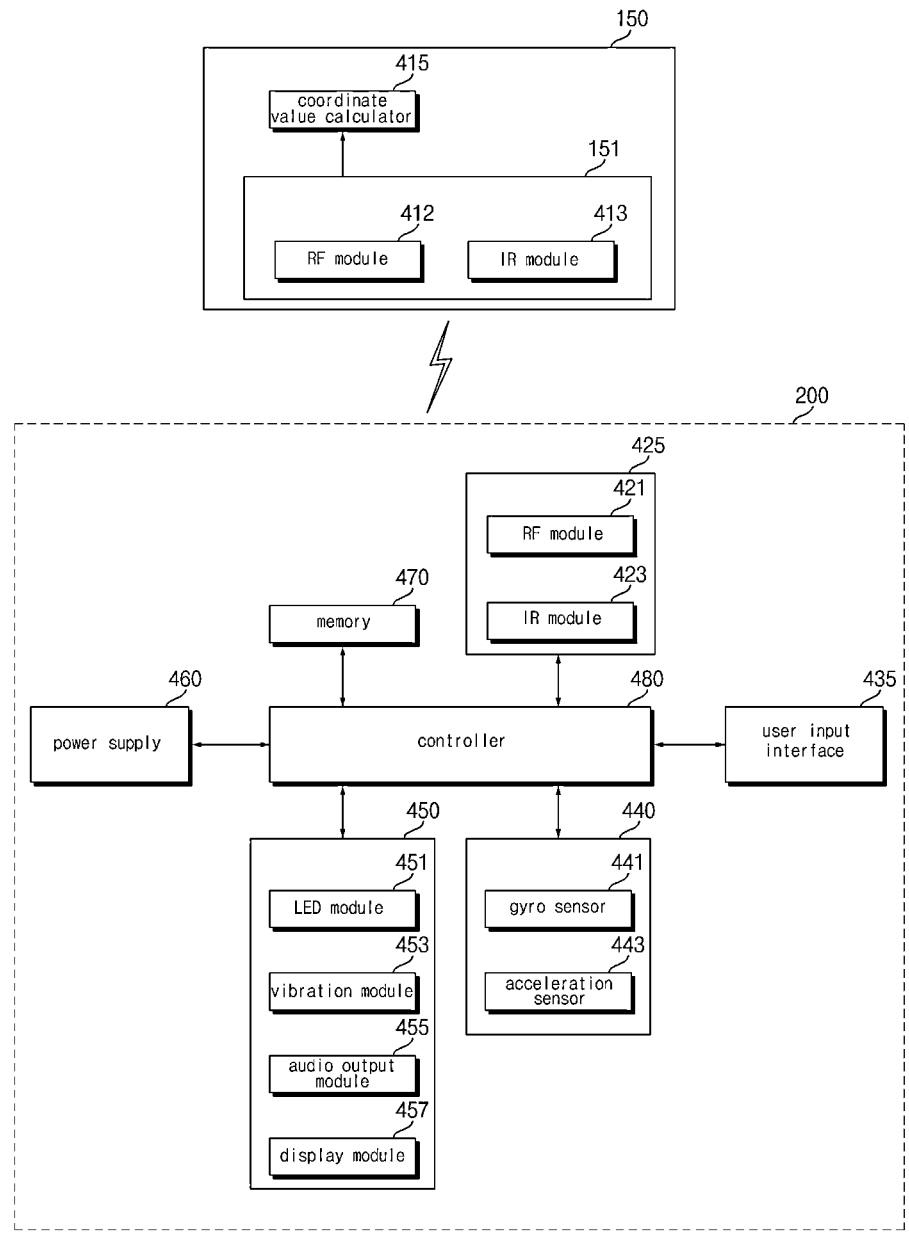
FIG. 4B is an internal block diagram of the remote control device of FIG. 2.

FIG. 4B is an internal block diagram of the remote controller of FIG. 2.

Referring to the drawing, the remote controller 200 includes a wireless transceiver 425, a user input interface 435, a sensor module 440, an output interface 450, a power supply 460, a memory 470, and a signal processor 480.

The wireless transceiver 425 transmits/receives a signal to/from any one of the image display apparatuses according to the embodiments of the present invention described above. Among the image display apparatuses according to the embodiments of the present invention, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input interface 435 may be implemented by a keypad, a button, a touch pad, a touch screen, or the like. The user may operate the user input interface 435 to input a command related to the image display apparatus 100 to the remote controller 200. When the user input interface 435 includes a hard key button, the user can input a command related to the image display apparatus 100 to the remote controller 200 through a push operation of the hard key button. When the user input interface 435 includes a touch screen, the user may touch a soft key of the touch screen to input the command related to the image display apparatus 100 to the remote controller 200. In addition, the user input interface 435 may include various types of input means such as a scroll key, a jog key, etc., which can be operated by the user, and the present invention does not limit the scope of the present invention.

The sensor module 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output interface 450 may output an image or an audio signal corresponding to the operation of the user input interface 435 or a signal transmitted from the image display apparatus 100. Through the output interface 450, the user may recognize whether the user input interface 435 is operated or whether the image display apparatus 100 is controlled.

For example, the output interface 450 may include an LED module 451 that is turned on when the user input interface 435 is operated or a signal is transmitted/received to/from the image display apparatus 100 through the wireless transceiver 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The signal processor 480 of the remote controller 200 may store information about a frequency band or the like for wirelessly transmitting and receiving a signal to/from the image display apparatus 100 paired with the remote controller 200 in the memory 470 and may refer to the stored information.

The signal processor 480 controls various matters related to the control of the remote controller 200. The signal processor 480 may transmit a signal corresponding to a certain key operation of the user input interface 435 or a signal corresponding to the motion of the remote controller 200 sensed by the sensor module 440 to the image display apparatus 100 through the wireless transceiver 425.

The user input interface 150 of the image display apparatus 100 includes a wireless transceiver 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless transceiver 151 and calculate the coordinate value (x, y) of the pointer 205 to be displayed on the display 180.

The transmission signal of the remote controller 200 inputted to the image display apparatus 100 through the user input interface 150 is transmitted to the signal processor 170 of the image display apparatus 100. The signal processor 170 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the signal processor 170 without a separate correction process of hand shake or error.

For another example, unlike the drawing, the coordinate value calculator 415 may be provided in the signal processor 170, not in the user input interface 150.

Figure 5:
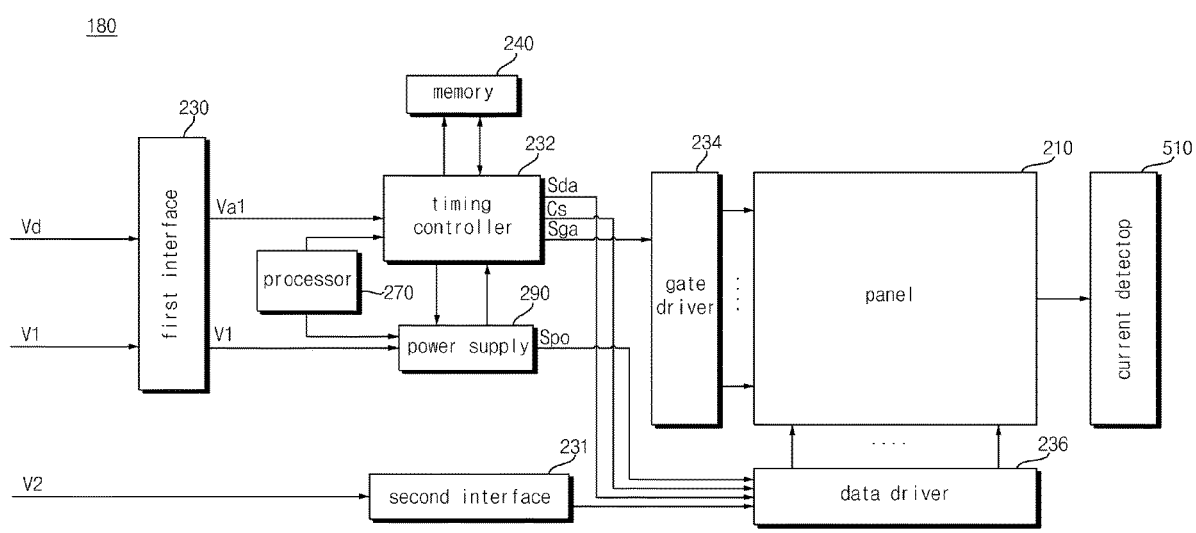
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Here, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210.

The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or greater than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
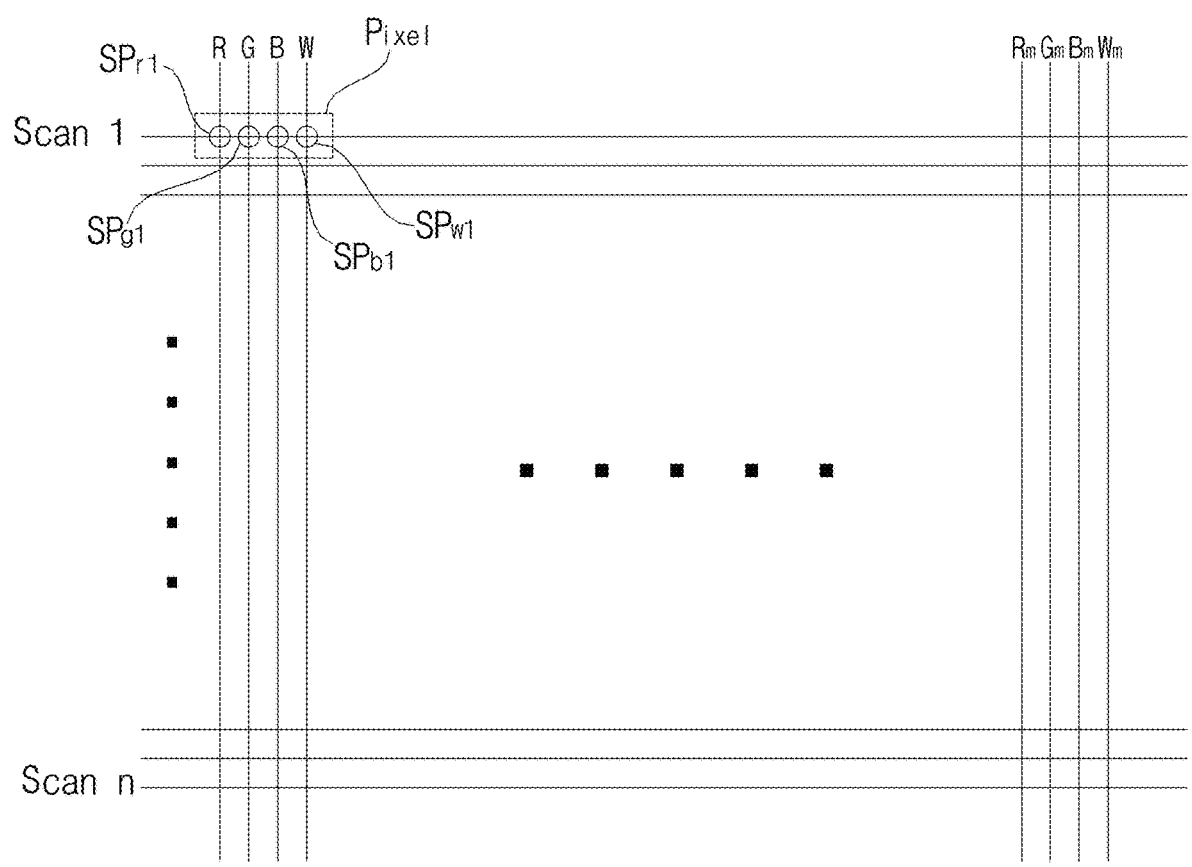
FIGS. 6A to 6B are views referenced for illustrating an organic light emitting panel of FIG. 5.
Figure 6B:
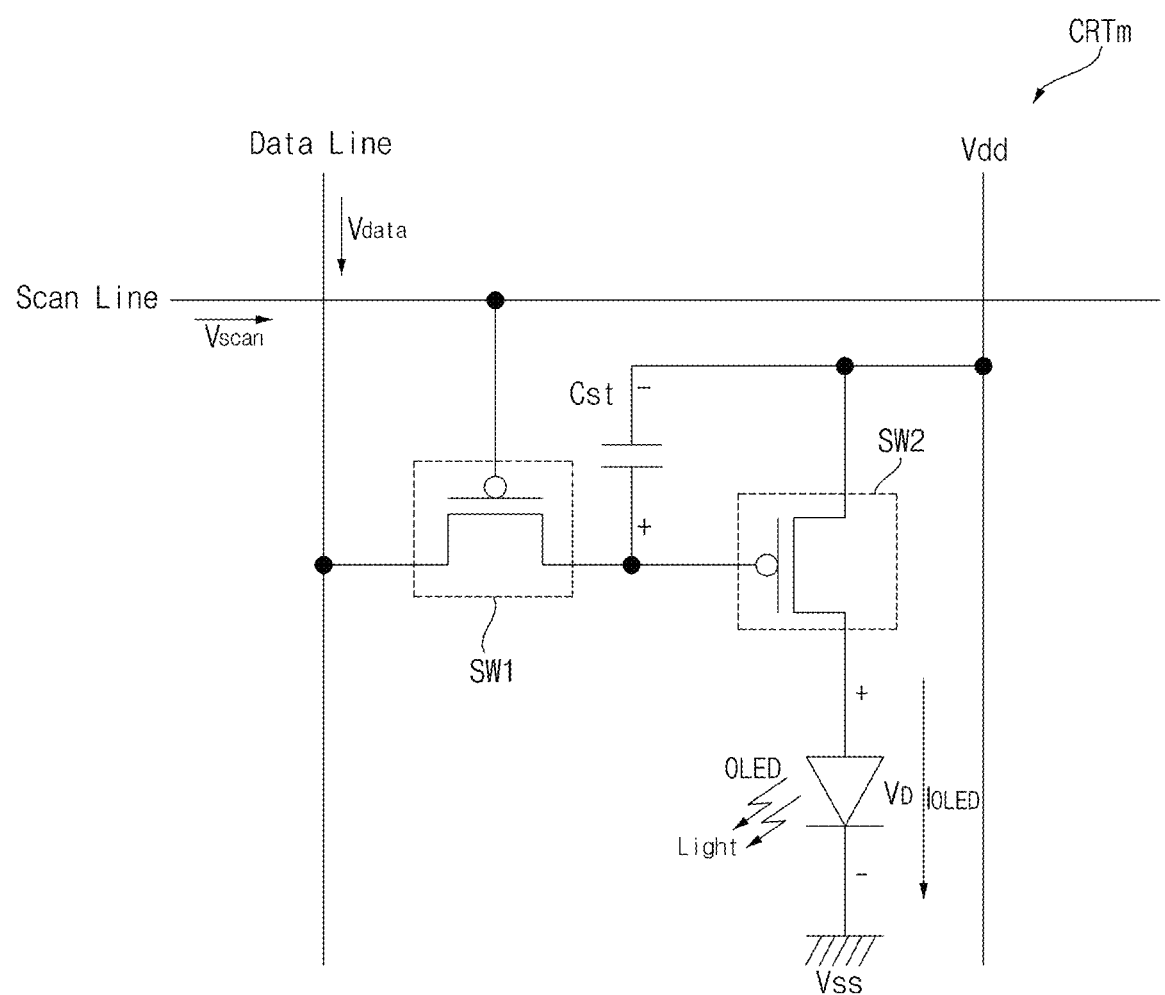

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), or an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
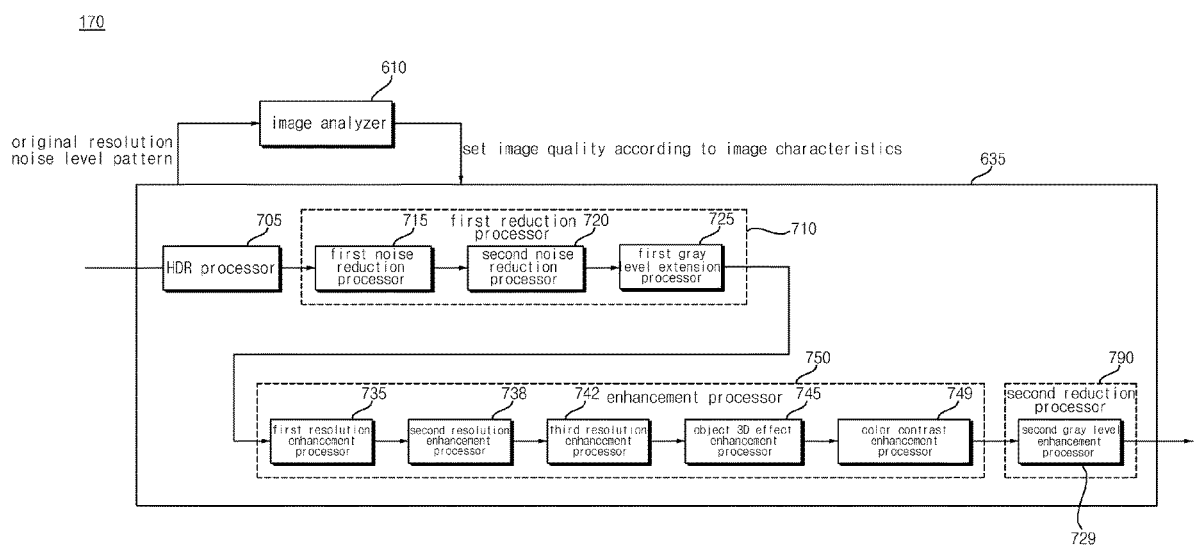
FIG. 7 illustrates an example of an internal block diagram of a signal processor of FIG. 2.
Figure 8A:
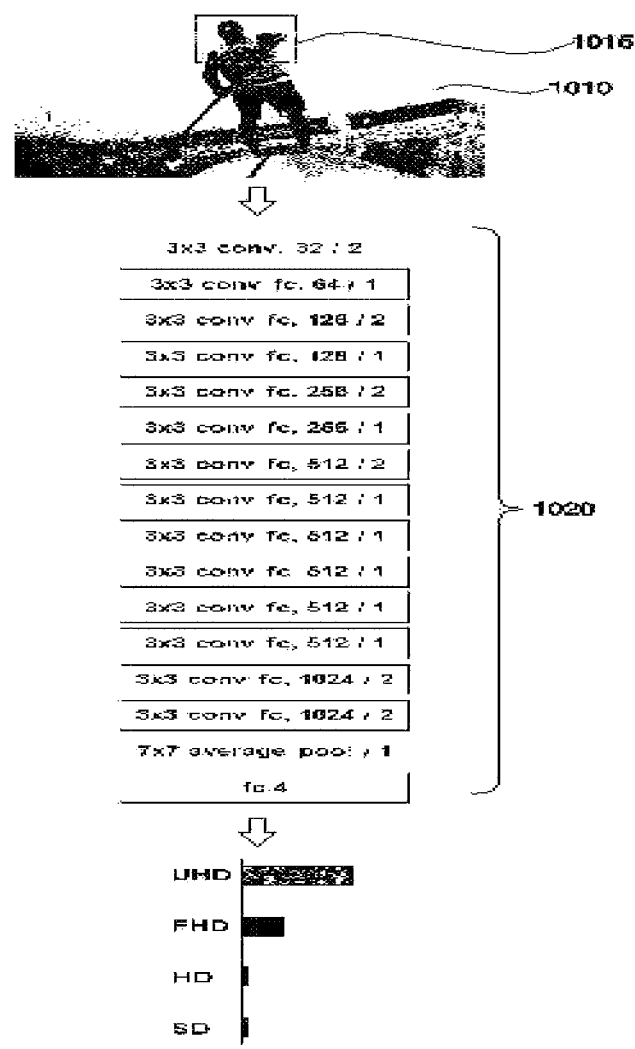

FIG. 7 illustrates an example of an internal block diagram of the signal processor of FIG. 2, and FIGS. 8A to 8B are views referenced for explanation of the operation of the signal processor of FIG. 7.

Referring to the drawings, the signal processor 170 according to an embodiment of the present invention may include an image analyzer 610 and an image quality processor 635.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may include an HDR processor 705, a first reduction processor 710, an enhancement processor 750, and a second reduction processor 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 performs gray level conversion. Accordingly, it is possible to improve high gray level expression for an input image.

Meanwhile, the HDR processor 705 may convert gray level according to a first gray level conversion mode, in which low gray level is to be enhanced and high gray level is to be saturated, and a second gray level conversion mode, in which low gray level and high gray level are somewhat uniformly converted.

Specifically, if the first gray level conversion mode is implemented, the HDR processor 705 may convert gray level based on data corresponding to the first gray level conversion mode in a lookup table.

More specifically, if the first gray level conversion mode is implemented, the HDR processor 705 may convert gray level based on an equation of input data and the first gray level conversion mode in a lookup table determined by the equation. Here, the input data may include video data and metadata.

Meanwhile, if the second gray level conversion mode is implemented, the HDR processor 705 may convert gray level based on data corresponding to the second gray level conversion mode in a lookup table.

More specifically, if the second gray level conversion mode is implemented, the HDR processor 705 may convert gray level based on an equation of input data and data corresponding to the second gray level conversion mode in a lookup table determined by the equation. Here, the input data may include video data and metadata.

Meanwhile, the HDR processor 705 may select the first gray level conversion mode or the second gray level conversion mode according to a third gray level conversion mode or a fourth gray level conversion mode in a high gray level amplifier 851 in the second reduction processor 790.

For example, if the third gray level conversion mode is implemented, the high gray level amplifier 851 in the second reduction processor 790 may convert gray level based on data corresponding to the third gray level conversion mode in a lookup table.

Specifically, if the third gray level conversion mode is implemented, the high gray level amplifier 851 in the second reduction processor 790 may perform convert gray level based on an equation of input data and data corresponding to the third gray level conversion mode in a lookup table determined by the equation. Here, the input data may include video data and metadata.

Meanwhile, if the fourth gray level conversion mode is implemented, the high gray level amplifier 851 in the second reduction processor 790 may convert gray level based on data corresponding to the fourth gray level conversion mode in a lookup table.

Specifically, if the fourth gray level conversion mode is implemented, the high gray level amplifier 851 in the second reduction processor 790 may perform convert gray level based on an equation of input data and data corresponding to the fourth gray level conversion mode in a lookup table determined by the equation. Here, the input data may include video data and metadata.

For example, if the fourth gray level conversion mode is implemented in the high gray level amplifier 851 in the second reduction processor 790, the HDR processor 705 may implement the second gray level conversion mode.

For another example, if the third gray level conversion mode is implemented in the high gray level amplifier 851 in the second reduction processor 790, the HDR processor 705 may implement the first gray level conversion mode.

Alternatively, the high gray level amplifier 851 in the second reduction processor 790 may change a gray level conversion mode according to a gray level conversion mode in the HDR processor 705.

For example, if the second gray level conversion mode is implemented in the HDR processor 705, the high gray level amplifier 851 in the second reduction processor 790 may perform the fourth gray level conversion mode.

For another example, if the first gray level conversion mode is implemented in the HDR processor 705, the high gray level amplifier 851 in the second reduction processor 790 may implement the third gray level conversion mode.

Meanwhile, the HDR processor 705 according to an embodiment of the present invention may implement a gray level conversion mode so that low gray level and high gray level are converted uniformly.

Meanwhile, according to the second gray level conversion mode in the HDR processor 705, the second reduction processor 790 may implement the fourth gray level conversion mode and thereby amplify an upper limit on gray level of a received input signal. Accordingly, it is possible to improve high gray level expression for the input image.

Next, the first reduction processor 710 may perform noise reduction on an input image signal or an image signal processed by the HDR processor 705.

Specifically, the first reduction processor 710 may perform multiple stages of noise reduction processing and a first stage of gray level extension processing on an input image signal or an HDR image from the HDR processor 705.

To this end, the first reduction processor 710 may include a plurality of noise reduction processors 715 and 720 for reducing noise in multiple stages, and a first gray level extension processor 725 for extending gray level.

Next, the enhancement processor 750 may perform multiple stages of image resolution enhancement processing on an image from the first reduction processor 710.

In addition, the enhancement processor 750 may perform object three-dimensional effect enhancement processing. In addition, the enhancement processor 750 may perform color or contrast enhancement processing.

To this end, the enhancement processor 750 may include: a plurality of resolution enhancement processors 735, 738, 742 for enhancing a resolution of an image in multiple stages; an object three-dimensional effect enhancement processor 745 for enhancing a three-dimensional effect of an object; and a color contrast enhancement processor 749 for enhancing color or contrast.

Next, the second reduction processor 790 may perform a second stage of gray level extension processing based on a noise-reduced image signal received from the first reduction processor 710.

Meanwhile, the second reduction processor 790 may amplify an upper limit on gray level of an input signal, and extend a resolution of high gray level of the input signal. Accordingly, it is possible to improve high gray level expression for an input image.

For example, gray level extension may be performed uniformly on the entire gray level range of an input signal. Accordingly, gray level extension is performed uniformly on the entire area of an input image, thereby improving high gray level expression.

Meanwhile, the second reduction processor 790 may perform gray level amplification and extension based on a signal received from the first gray level extension processor 725. Accordingly, it is possible to improve high gray level expression for an input image.

Meanwhile, if an input image signal input is an SDR image signal, the second reduction processor 790 may change the degree of amplification based on a user input signal. Accordingly, it is possible to improve high gray level expression in response to a user setting.

Meanwhile, if an input image signal is an HDR image signal, the second reduction processor 790 may perform amplification according to a set value. Accordingly, it is possible to improve high gray level expression for an input image.

Meanwhile, if an input image signal is an HDR image signal, the second reduction processor 790 may change the degree of amplification based on a user input signal. Accordingly, it is possible to improve high gray level expression according to a user setting.

Meanwhile, in the case of extending gray level based on a user input signal, the second reduction processor 790 may change the degree of extension of gray level. Accordingly, it is possible to improve high gray level expression according to a user's setting.

Meanwhile, the second reduction processor 790 may amplify an upper limit on gray level according to a gray level conversion mode in the HDR processor 705. Accordingly, it is possible to improve high gray level expression for an input image.

The signal processor 170 includes the HDR processor 705 configured to receive an image signal and adjust luminance of the input image signal, and the reduction processor 790 configured to amplify brightness of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the signal processor 170.

Meanwhile, the signal processor 170 further includes an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the signal processor 170.

Meanwhile, a control signal is received from a controller of an image display apparatus, which relates to signal processing, and the control signal corresponds to a setting of the image display apparatus.

Meanwhile, the reduction processor 790 may include the high gray level amplifier 851 configured to amplify an upper limit on gray level of an input signal, and a decontouring processor 842 and 844 configured to extend the resolution of gray level amplified by the high gray level amplifier 851.

The second reduction processor 790 may include a second gray level extension processor 729 for a second stage of gray level extension.

Meanwhile, the image quality processor 635 in the signal processor 170 according to the present invention is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction processors 715 and 720 in the first reduction processor 710, and the two stages of gray level extension processing may be performed by the first gray level extension processor 725 in the first reduction processor 710 and the second gray level extension processor 729 in the second reduction processor 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancement processors 735, 738, and 742, and the object three-dimensional effect enhancement may be performed by the object three-dimensional enhancement processor 745.

Meanwhile, the signal processor 170 of the present invention may apply the same algorithm or similar algorithms to image quality processing multiple times, thereby enabled to gradually enhance an image quality.

To this end, the image quality processor 635 of the signal processor 170 of the present invention may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in multiple stages, there is an advantageous effect to cause a less number of artifacts to appear in an image, resulting in a more natural and more vivid image processing result.

Meanwhile, the same algorithm or the similar algorithms are applied multiple times alternately with a different image quality algorithm, thereby bringing an effect more than simple continuous processing.

Meanwhile, the signal processor 170 of the present invention may perform noise reduction processing in multiple stages. Each stage of noise reduction processing may include temporal processing and spatial processing.

Meanwhile, in order to calculate original quality of an image signal, the present invention uses the state-of-the-art technology such as artificial intelligence (AI). To this end, a Deep Neural Network (DNN) may be used.

The quality calculator 632 may calculate a resolution and a noise level of an input image signal using the DNN.

The quality calculator 632 may obtain an original resolution and a training image for each compression rate, and train the network so as to increase accuracy of the calculation.

A variety of images which can be commonly seen in ordinary broadcasting programs are provided as images used for the training, and thus, it is possible to cover any input environment.

Meanwhile, in order to reduce detection time or cost, the quality calculator 632 may perform learning using Convolutional Neural Network, Mobile-Net, and the like which has few number of layers.

For example, the quality calculator 632 may analyze only a region (e.g., 224×224, 128×128, 64×64, etc.) of an entire image.

Meanwhile, the quality calculator 632 may select a detection region appropriate for a purpose of detection.

For example, the quality calculator 632 may select a first region having the greatest number of edge components when detecting an original resolution, and select a second region having the least number of edge components when detecting noise.

In particular, the quality calculator 632 may apply an algorithm that selects a detection region in a short time in order to increase a processing speed.

For example, the quality calculator 632 may perform pre-processing such as Fast Fourier Transform (FFT) on a detection region.

FIG. 8A is a diagram showing calculation based on a Convolutional Neural Network (CNN).

Referring to the drawing, a convolutional neural network is used for a particular region 1015 in an acquired image 1010.

As the convolution neural network, a convolution network and a deconvolution network may be implemented.

According to the convolution neural network, convolution and pooling are performed repeatedly.

Meanwhile, according to the CNN scheme shown in FIG. 9A, information on the region 1015 may be used to determine types of pixels in the region 1015.

FIG. 8B is a diagram showing calculation based on Mobile-Net.

According to the scheme shown in the drawing, quality calculation is performed.

Meanwhile, as original quality changes, the signal processor 170 of the present invention may apply an image quality setting corresponding to the changed quality in real time.

In particular, the signal processor 170 may perform control apply, when the image quality setting is changed, the change of the image quality setting without any condition such as a channel change or an input change while an image is reproduced.

In this case, "real time" refers to employing a temporal processing technique including imaging infrared (IIR) and step movement.

Meanwhile, an input image input to the image display apparatus 100 may be input as a fixed image size set in the external device 400 or may be input as a compressed image size through an internal image decoder.

Accordingly, the signal processor 170 in the image display apparatus 100 may expand an image size with at least one scaler for image size expansion, image quality processing, etc., and performs image quality processing to improve sharpness.

Here, only an input image having a specific size was subjected to image size expansion and image quality processing.

In addition, image quality processing is based on low-level feature such as variance indicating a distribution of a difference between a median value of an edge or a pixel and a peripheral value, having a limitation that is not adaptive to the image resolution.

In addition, image quality processing was performed with only the input image resolution regardless of a source resolution of the input image, and there is a limitation in that an improvement filter and a size adjustment filter cannot be applied correspondingly to the original resolution of the input image.

Meanwhile, research into a super resolution (SR) algorithm has been conducted regarding the number of frames in use, in which of data region of a spatial region feature matching with a frequency is to be performed, whether high-resolution images are to be inferred from input low-resolution or whether to use a data set having a previously created codebook concept.

The SR algorithm includes two key steps in common. The first is how to create or from which candidate data to be used as an image patch that represents high resolution and the second is extracting features to be used to compare and determine interrelationship between the input low-resolution image and the data defined in the first step.

The features used here are diverse such as edge and periphery values, brightness of corresponding pixels, color difference or histogram, and pattern direction, but low- or mid-level features are generally used in image processing fields.

However, real images are very diverse in many ways for human analysis, and there is a limit for human to directly develop improved filters for generating features and high-resolution candidate patches, and thus improvement of performance of the SR has stagnated after reaching a certain level.

Meanwhile, deep learning, which is mainly used in the image field, has a form in which several layers are sequentially connected, and an output of each layer is used as an input of the next layer. Also, all layers calculate the entirety or part of input data as a weighted sum and obtain a resultant output by applying a non-linear function to the calculated value. Also, in the learning process, a weight of the synapse connecting inputs and outputs of all layers is obtained.

Such a deep learning structure has several similarities when compared to the SR algorithm.

First, a feature extraction filter and an image quality improvement filter used in the SR algorithm will play a similar role to the synapse weight in the deep learning structure, and secondly, whether to reflect multiple filter results of the SR in the deep learning layer or strength may be considered by matching output determination through non-linearity. In addition, compared to the existing case where images of at most 100 units are referenced in the algorithm development process, deep learning-based algorithms use more than 10,000 units of learning data, so the deep learning-based algorithm is considered to more elaborately analyze more images than human to generate an improvement filter fitting thereto.

Therefore, in the present disclosure, a super resolution SR may be performed by using an artificial intelligence technology based algorithm.

Figure 9:
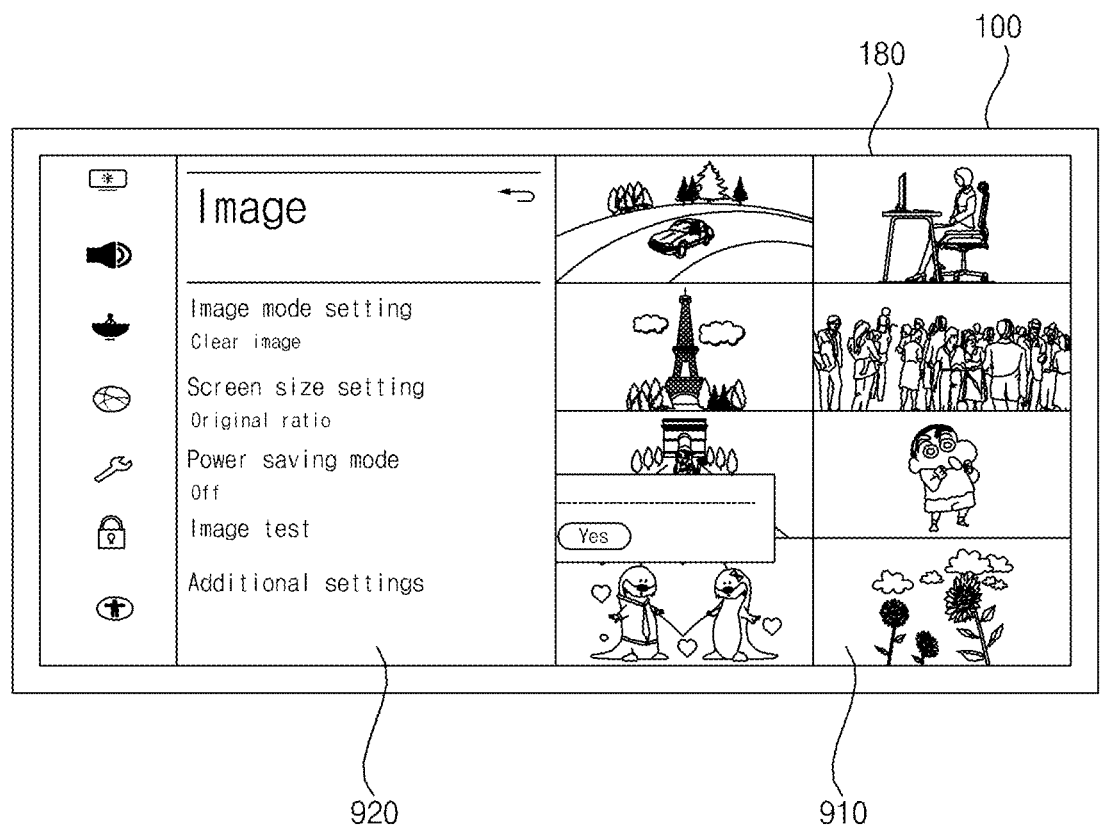
FIG. 9 is a view illustrating that an OSD and an image are mixed and displayed.

FIG. 9 is a view illustrating that an OSD and an image are mixed and displayed.

Referring to the figure, the display 180 of the image display apparatus 100 may display an OSD 920 and an image 910 jointly.

For example, the OSD 920 may be displayed in a part (left side) of the image 910 jointly.

In this case, when the resolutions of the OSD 920 and the image 910 displayed at a left area of the display 180 are different, it is desirable upscale the resolution of the OSD 920 according to the resolution of the image 910.

However, when only the resolution of the OSD 920 is upscaled, an edge area or a boundary area of the OSD 920 is not smoothly processed, and as a result, the clarity of the OSD 920 is degraded.

Therefore, the present disclosure proposes a method which may enhance the clarity of the OSD 920 while upscaling the resolution of the OSD 920 according to the resolution of the image 910 when the resolutions of the OSD 920 and the image 910 are different. This will be described with reference to FIG. 10 and below.

Figure 10:
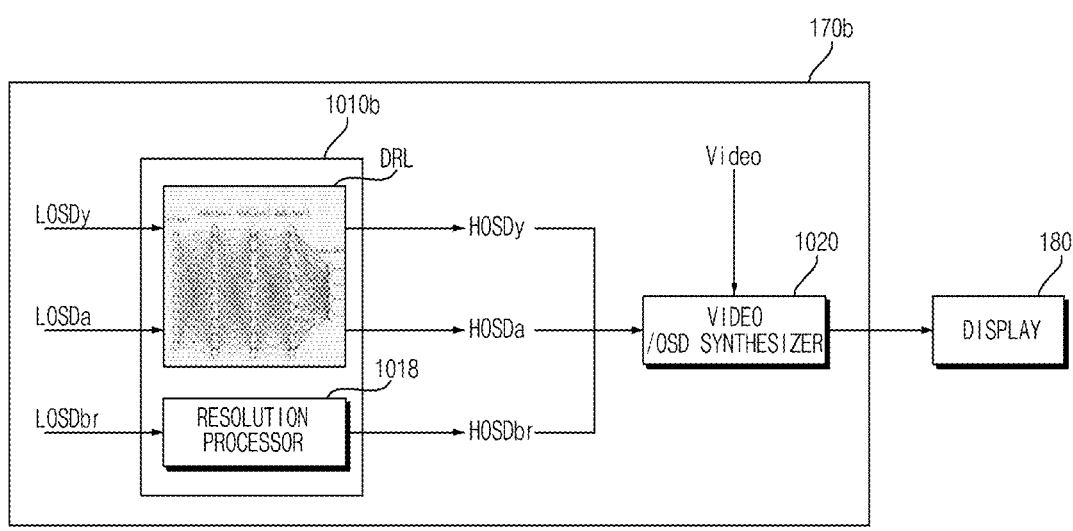
FIG. 10 is a view illustrating an internal block diagram of a signal processor according to an embodiment of the present disclosure.

FIG. 10 is a view illustrating an internal block diagram of a signal processor according to an embodiment of the present disclosure.

Referring to the figure, a signal processor 170a may include an OSD processor 1010 upscaling an OSD having a first resolution to a second resolution greater than the first resolution and a synthesizer 1020 synthesizing at least a part of an image having the second resolution and the upscaled OSD having the second resolution.

In this case, the OSD processor 1010 outputs the OSD having the second resolution, in which luminance and transparency are adjusted. As a result, while the resolution of the OSD is increased, the clarity of the OSD may be increased and noise may be reduced when mixing with the image.

For example, when it is assumed that the first resolution 2K and the second resolution is 4K, the signal processor 170a may first upscale a 2K OSD and convert the 2K OSD into a 4K resolution at the time of synthesizing the 2K OSD and the 4K image. In this case, the super resolution algorithm may also be used.

Meanwhile, it is desirable that the OSD processor 1010 increases luminance Y and transparency α of the 2K OSD for enhancement of the clarity of the OSD.

That is, the OSD processor 1010 may control luminance HOSDy and transparency of the OSD having the second resolution to be greater than the luminance and the transparency of the OSD having the first resolution after upscaling the OSD having the first resolution to the second resolution.

As a result, while the resolution of the OSD is increased, the clarity of the OSD may be increased and the noise may be reduced when mixing with the image.

Meanwhile, the OSD processor 1010 may control change amounts of the luminance HOSDy and the transparency of the OSD having the second resolution to be larger as a difference between the first resolution and the second resolution increases.

For example, when it is assumed that the first resolution 2K and the second resolution is 8K, the signal processor 170a may first upscale a 2K OSD and convert the 2K OSD into a 8K resolution at the time of synthesizing the 2K OSD and the 8K image. In this case, the super resolution algorithm may also be used.

Meanwhile, it is desirable that the OSD processor 1010 increases luminance Y and transparency α of the 2K OSD for enhancement of the clarity of the OSD.

In this case, it is desirable that the OSD processor 1010 further increases the luminance Y and the transparency α of the OSD in a case where 2K is upscaled to 8K as compared with a case where 2K is upscaled to 4K.

As such, the change amounts of the luminance and the transparency are changed according to the difference between the first resolution and the second resolution to increase the clarity of the OSD and reduce the noise when mixing with the image.

Meanwhile, it is desirable that the OSD processor 1010 performs signal processing so that the clarities of the luminance Y and the transparency α of the OSD are equal to each other when the luminance Y and the transparency α of the OSC increase. As a result, the clarity of the OSD may be increased and the noise may be reduced.

Meanwhile, the OSD processor 1010 may be configured to increase transparency HOSDa of the OSD having the second resolution as the luminance of the image increases and control the transparency HOSDa of the OSD having the second resolution to decrease as the luminance of the image decreases. As such, the transparency is adjusted according to the luminance of the image to increase the clarity of the OSD and reduce the noise when mixing with the image.

Meanwhile, the OSD processor 1010 may be configured to increase sharpness of the transparency HOSDa of the OSD having the second resolution. As such, the sharpness of the transparency is adjusted to increase the clarity of the OSD and reduce the noise when mixing with the image.

Meanwhile, the OSD processor 1010 may be configured to jointly increase the luminance HOSDy and the sharpness of the transparency of the OSD having the second resolution. As such, the sharpness of the transparency is adjusted to increase the clarity of the OSD and reduce the noise when mixing with the image.

Meanwhile, the OSD processor 1010 may be configured to increase the change amounts of the luminance HOSDy and the sharpness of the transparency of the OSD having the second resolution as the luminance of the image increases and control the change amounts of the luminance HOSDy and the sharpness of the transparency of the OSD having the second resolution to decrease as the luminance of the image decreases.

As a result, while the resolution of the OSD is increased, the clarity of the OSD may be increased and the noise may be reduced when mixing with the image.

Meanwhile, the OSD processor 1010 may output the OSD having the second resolution, in which colors Cb and Cr are further adjusted. As a result, while the resolution of the OSD is increased, the clarity of the OSD may be increased and the noise may be reduced when mixing with the image.

Meanwhile, the OSD processor 1010 may control a level of a color HOSDbr of the OSD having the second resolution to be greater than the level of a color LOSDbr of the OSD having the first resolution after luminance after upscaling the OSD having the first resolution to the second resolution. As a result, while the resolution of the OSD is increased, the clarity of the OSD may be increased and the noise may be reduced when mixing with the image.

Meanwhile, the OSD processor 1010 may include a first resolution processor 1012 changing the luminance LOSDy of the OSD having the first resolution to the luminance HOSDy of the OSD having the second resolution, a second resolution processor 1014 changing the transparency LOSDa of the OSD having the first resolution to the transparency HOSDa of the OSD having the second resolution, and a third resolution processor 1016 changing the color LOSDbr of the OSD having the first resolution to the color HOSDbr of the OSD having the second resolution.

The first resolution processor 1012 may perform image quality processing with the resolution of a luminance component Y of the OSD.

For example, the first resolution processor 1012 increases the resolution of the luminance of the OSD having the first resolution to convert and output the luminance of the OSD having the second resolution which is the same as the image.

The second resolution processor 1014 may perform image quality processing with the resolution of the transparency of the OSD.

For example, the second resolution processor 1014 increases the resolution of the transparency of the OSD having the first resolution to convert and output the transparency of the OSD having the first resolution into the transparency of the OSD having the second resolution which is the same as the image.

Meanwhile, the second resolution processor 1014 may perform image quality processing with alpha (α) which is a blending ratio of the image and the OSD.

For example, the second resolution processor 1014 increases the resolution of the alpha (α) of the OSD having the first resolution to convert and output the alpha (α) of the OSD having the first resolution into the alpha (α) of the OSD having the second resolution which is the same as the image.

Meanwhile, the third resolution processor 1016 may perform image quality processing with the resolutions of the color components Cb and Cr of the OSD.

For example, the third resolution processor 1016 increases the resolutions of the colors Cb and Cr of the OSD having the first resolution to convert and output the colors Cb and Cr of the OSD having the first resolution into the colors Cb and Cr of the OSD having the second resolution which is the same as the image.

As a result, while the resolution of the OSD is increased, the clarity of the OSD may be increased and the noise may be reduced when mixing with the image.

Figure 11:
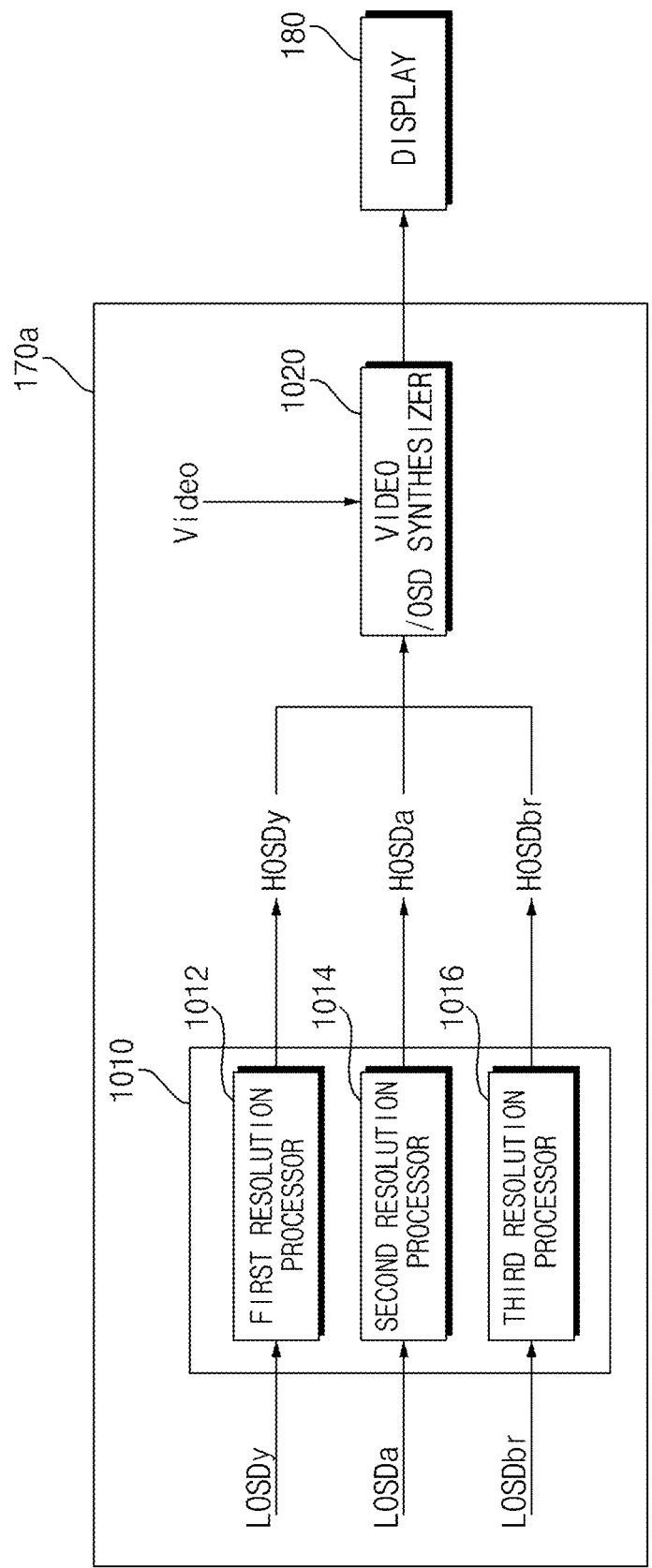
FIG. 11 is a view illustrating an internal block diagram of a signal processor according to another embodiment of the present disclosure.

FIG. 11 is a view illustrating an internal block diagram of a signal processor according to another embodiment of the present disclosure.

Referring to the figure, a signal processor 170b may include a learning processor DRL that upscales an OSD having a first resolution to a second resolution greater than the first resolution and a synthesizer 1020 that synthesizes at least a part of an image having the second resolution and the upscaled OSD having the second resolution.

Referring to the figure, a signal processor 170b according to another embodiment of the present disclosure is similar to the signal processor 170 of FIG. 10, but different from the signal processor 170 of FIG. 10 in that the OSD processor 1010b includes the learning processor DRL and the resolution processor 1018.

Meanwhile, the resolution processor 1018 may correspond to the third resolution processor 1016 of FIG. 10.

The learning processor DRL may change the luminance of LOSDy of the OSD having the first resolution to the luminance HOSDy of the OSD having the second resolution, and change the transparency LOSDa of the OSD having the first resolution to the transparency HOSDa of the OSD having the second resolution, based on the learning using the deep neural network.

In this case, the learning processor DRL outputs the OSD having the second resolution, in which the luminance and the transparency are adjusted, based on the learning using the deep neural network. As a result, while the resolution of the OSD is increased, the clarity of the OSD may be increased and the noise may be reduced when mixing with the image.

For example, when it is assumed that the first resolution 2K and the second resolution is 4K, the signal processor 170a may first upscale a 2K OSD and convert the 2K OSD into a 4K resolution at the time of synthesizing the 2K OSD and the 4K image. In this case, the super resolution algorithm may also be used.

Meanwhile, it is desirable that the learning processor DRL increases the luminance Y and the transparency α of the 2K OSD for enhancement of the clarity of the OSD, based on the learning using the deep neural network.

That is, the learning processor DRL may control the luminance HOSDy and the transparency of the OSD having the second resolution to be greater than the luminance and the transparency of the OSD having the first resolution after upscaling the OSD having the first resolution to the second resolution, based on the learning using the deep neural network.

As a result, while the resolution of the OSD is increased, the clarity of the OSD may be increased and the noise may be reduced when mixing with the image.

Meanwhile, the learning processor DRL may control the change amounts of the luminance HOSDy and the transparency of the OSD having the second resolution to be larger as the difference between the first resolution and the second resolution increases, based on the learning using the deep neural network.

For example, when it is assumed that the first resolution 2K and the second resolution is 8K, the signal processor 170a may first upscale a 2K OSD and convert the 2K OSD into a 8K resolution at the time of synthesizing the 2K OSD and the 8K image. In this case, the super resolution algorithm may also be used.

Meanwhile, it is desirable that the learning processor DRL increases the luminance Y and the transparency α of the 2K OSD for enhancement of the clarity of the OSD, based on the learning using the deep neural network.

In this case, it is desirable that the learning processor DRL further increases the luminance Y and the transparency α of the OSD in a case where 2K is upscaled to 8K as compared with a case where 2K is upscaled to 4K.

As such, the change amounts of the luminance and the transparency are changed according to the difference between the first resolution and the second resolution to increase the clarity of the OSD and reduce the noise when mixing with the image.

Meanwhile, it is desirable that the learning processor DRL performs signal processing so that the clarities of the luminance Y and the transparency α of the OSD are equal to each other when the luminance Y and the transparency α of the OSC increase, based on the learning using the deep neural network. As a result, the clarity of the OSD may be increased and the noise may be reduced.

Meanwhile, the learning processor DRL may be configured to increase transparency HOSDa of the OSD having the second resolution as the luminance of the image increases and control the transparency HOSDa of the OSD having the second resolution to decrease as the luminance of the image decreases, based on the learning using the deep neural network. As such, the transparency is adjusted according to the luminance of the image to increase the clarity of the OSD and reduce the noise when mixing with the image.

Meanwhile, the learning processor DRL may be configured to increase sharpness of the transparency HOSDa of the OSD having the second resolution, based on the learning using the deep neural network. As such, the sharpness of the transparency is adjusted to increase the clarity of the OSD and reduce the noise when mixing with the image.

Meanwhile, the learning processor DRL may be configured to jointly increase the luminance HOSDy and the sharpness of the transparency of the OSD having the second resolution, based on the learning using the deep neural network. As such, the sharpness of the transparency is adjusted to increase the clarity of the OSD and reduce the noise when mixing with the image.

Meanwhile, the learning processor DRL may be configured to increase the change amounts of the luminance HOSDy and the sharpness of the transparency of the OSD having the second resolution as the luminance of the image increases and control the change amounts of the luminance HOSDy and the sharpness of the transparency of the OSD having the second resolution to decrease as the luminance of the image decreases.

As a result, while the resolution of the OSD is increased, the clarity of the OSD may be increased and the noise may be reduced when mixing with the image.

Figure 12A:
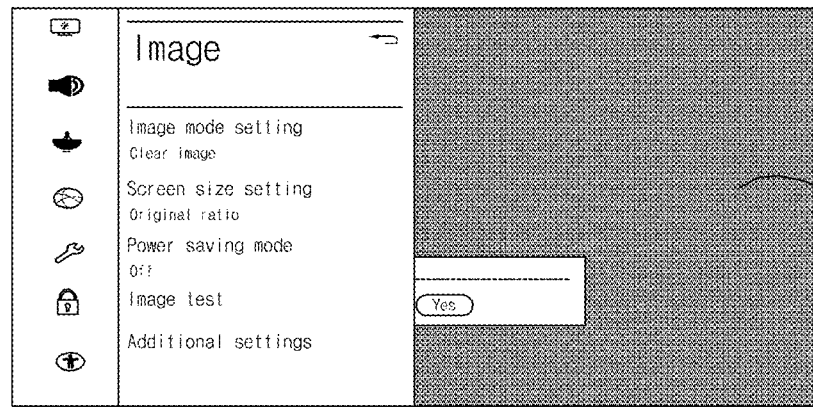
FIGS. 12A to 13 are views referenced for the operation description of FIG. 10 or 11.
Figure 12A:
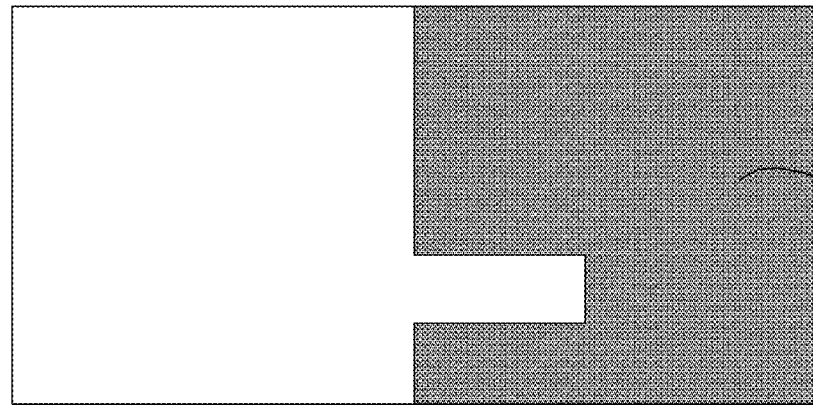
Figure 12A:
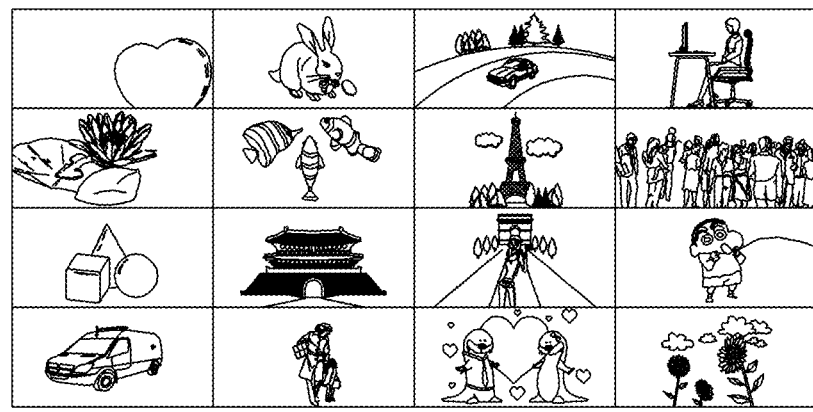
Figure 12B:
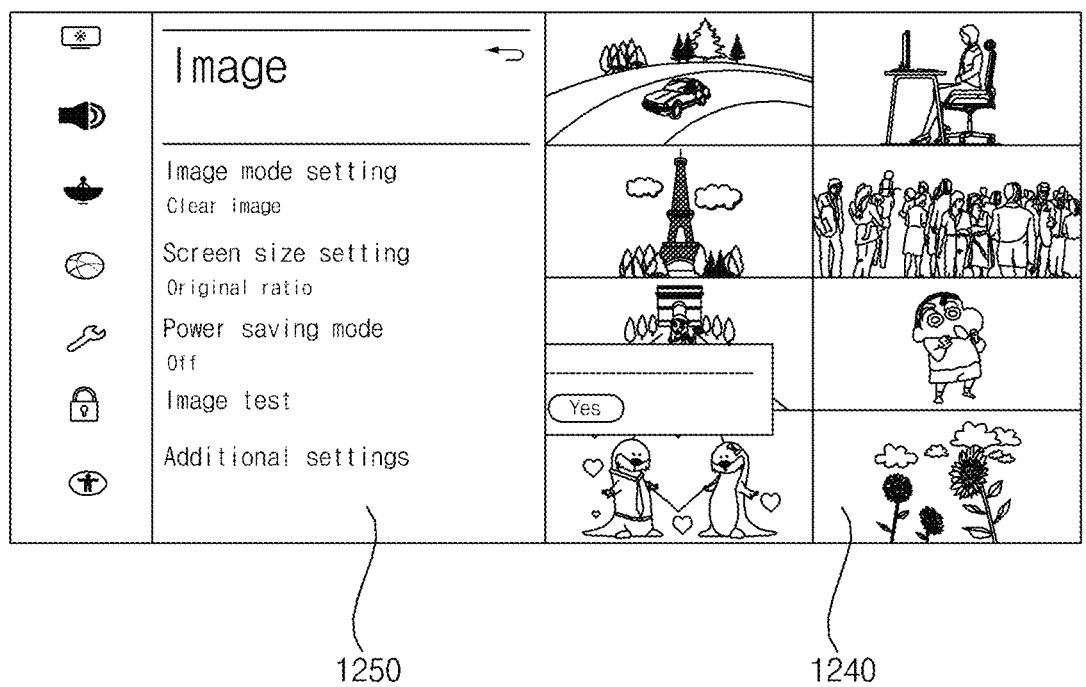
Figure 13:
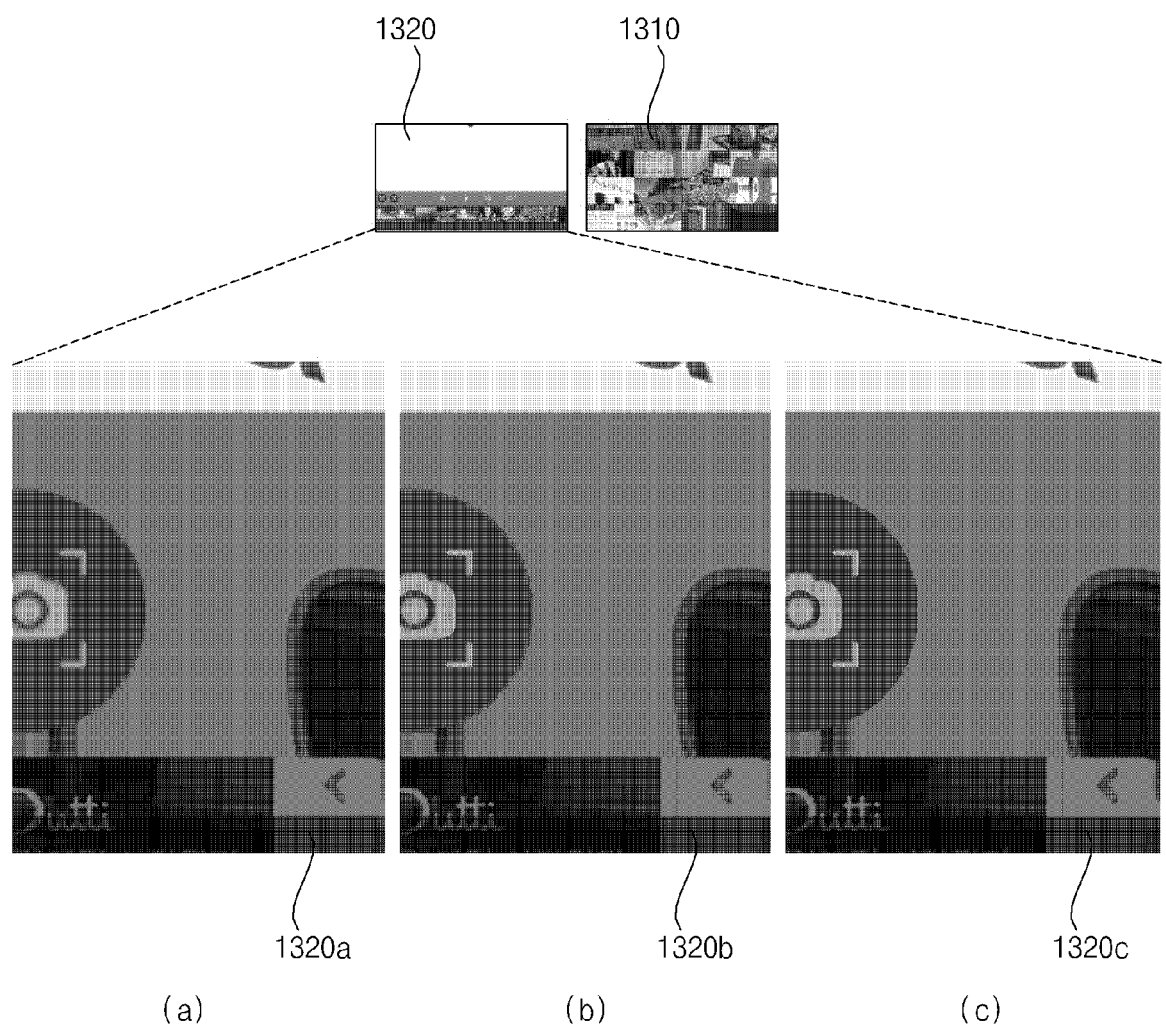

FIGS. 12A to 13 are views referenced for the operation description of FIG. 10 or 11.

First, FIG. 12A illustrates an OSD 1210, a transparency or alpha 1220 of the OSD, and an input image 1230.

The signal processor 170 according to the embodiment of the present disclosure may blend the OSD 1210 and the input image 1230 by using the transparency or the alpha 1220 of the OSD when synthesizing the OSD 1210 and the input image 1230.

In this case, as described above, the signal processor 170 allows the OSD of which luminance and transparency are adjusted, and the input image to be synthesized while upscaling the OSD.

FIG. 12B illustrates that the OSD 1250 of which luminance and transparency are adjusted, and the input image 1240 are synthesized according to the embodiment of the present disclosure.

As a result, while the resolution of the OSD is increased, the clarity of the OSD may be increased and the noise may be reduced when mixing with the image. In particular, the clarity in an edge area or a border area of the OSD is enhanced.

FIG. 13A illustrates an OSD 1320 having a first resolution and an input image 1310 having a second resolution.

When image quality improvement is not performed for the OSD 1320 having the first resolution, i.e., when the resolution is not increased or only the resolution is increased, and the luminance and the transparency are not adjusted, the clarity is low in the edge area or the border area of an OSD 1320a as illustrated in FIG. 13A.

Meanwhile, when image quality improvement is performed for the OSD 1320 having the first resolution, i.e., when the resolution of the OSD is increased and the luminance is increased, the clarity is enhanced in the edge area or the border area of an OSD 1320b as illustrated in FIG. 13B.

Meanwhile, when image quality improvement is performed for the OSD 1320 having the first resolution, i.e., when the resolution of the OSD is increased and the luminance and the transparency are increased, the clarity is further enhanced in the edge area or the border area of an OSD 1320c as illustrated in FIG. 13C.

Meanwhile, the signal processor 170a and the image display apparatus including the same according to another embodiment of the present disclosure includes an OSD processor 1010 that upscales an OSD having a first resolution to a second resolution greater than the first resolution and a synthesizer 1020 that synthesizes at least a part of an image having the second resolution and the upscaled OSD having the second resolution, and the OSD processor 1010 outputs the OSD having the second resolution, in which the blending ratio of the image and the OSD, and the luminance are adjusted. As a result, while the resolution of the OSD is increased, the clarity of the OSD may be increased and the noise may be reduced when mixing with the image.

Meanwhile, the OSD processor 1010 may control the luminance HOSDy and the blending ratio of the OSD having the second resolution to be greater than the luminance and the blending ratio of the OSD having the first resolution after upscaling the OSD having the first resolution to the second resolution. As a result, while the resolution of the OSD is increased, the clarity of the OSD may be increased and the noise may be reduced when mixing with the image.

Meanwhile, the OSD processor 1010 may control change amounts of the luminance HOSDy and the blending ratio of the OSD having the second resolution to be larger as the difference between the first resolution and the second resolution increases. As a result, while the resolution of the OSD is increased, the clarity of the OSD may be increased and the noise may be reduced when mixing with the image. As such, the change amounts of the luminance and the blending ratio are changed according to the difference between the first resolution and the second resolution to increase the clarity of the OSD and reduce the noise when mixing with the image.

Meanwhile, the OSD processor 1010 may be configured to increase the blending ratio of the OSD having the second resolution as the luminance of the image increases and control the blending ratio of the OSD having the second resolution to decrease as the luminance of the image decreases. As a result, while the resolution of the OSD is increased, the clarity of the OSD may be increased and the noise may be reduced when mixing with the image. As such, the blending ratio is adjusted according to the luminance of the image to increase the clarity of the OSD and reduce the noise when mixing with the image.

Meanwhile, the OSD processor 1010 may be configured to increase the sharpness of the blending ratio of the OSD having the second resolution. As such, the clarity of the OSD may be increased and the noise may be reduced when mixing with the image according to the blending ratio.

Meanwhile, the OSD processor 1010 may be configured to increase the change amounts of the luminance HOSDy and the sharpness of the blending ratio of the OSD having the second resolution as the luminance of the image increases and decrease the change amounts of the luminance HOSDy and the sharpness of the blending ratio of the OSD having the second resolution as the luminance of the image decreases. As a result, while the resolution of the OSD is increased, the clarity of the OSD may be increased and the noise may be reduced when mixing with the image.

Meanwhile, the OSD processor 1010 may output the OSD having the second resolution, in which a color is further adjusted. As a result, while the resolution of the OSD is increased, the clarity of the OSD may be increased and the noise may be reduced when mixing with the image.

Meanwhile, the OSD processor 1010 may control a level of a color HOSDbr of the OSD having the second resolution to be greater than the level of a color LOSDbr of the OSD having the first resolution after luminance after upscaling the OSD having the first resolution to the second resolution. As a result, while the resolution of the OSD is increased, the clarity of the OSD may be increased and the noise may be reduced when mixing with the image.

Meanwhile, the OSD processor 1010 may include a first resolution processor that changes the luminance LOSDy of the OSD having the first resolution to the luminance HOSDy of the OSD having the second resolution, a second resolution processor that changes the blending ratio of the OSD having the first resolution to the blending ratio of the OSD having the second resolution, and a third resolution processor that changes the color LOSDbr of the OSD having the first resolution to the color HOSDbr of the OSD having the second resolution. As a result, while the resolution of the OSD is increased, the clarity of the OSD may be increased and the noise may be reduced when mixing with the image.

The signal processing device 170 and the image display apparatus 100 including the same according to the embodiment of the present disclosure may be extensively applied to 4K TV, 8K TV, signage including a plurality of displays, etc.

While the preferred embodiments of the present disclosure have been illustrated and described above, the present disclosure is not limited to the aforementioned specific embodiments, various modifications may be made by a person with ordinary skill in the technical field to which the present disclosure pertains without departing from the subject matters of the present disclosure that are claimed in the claims, and these modifications should not be appreciated individually from the technical spirit or prospect of the present disclosure.

What is claimed is:

1. A signal processing device comprising:
an on screen display (OSD) processor configured to upscale an OSD having a first resolution to a second resolution greater than the first resolution; and
a synthesizer configured to synthesize at least a part of an image having the second resolution and the upscaled OSD having the second resolution,
wherein the OSD processor outputs the upscaled OSD having the second resolution, in which luminance and transparency are adjusted, and
wherein the OSD processor controls the luminance and the transparency of the upscaled OSD having the second resolution to be greater than the luminance and the transparency of the OSD having the first resolution after upscaling the OSD having the first resolution to the second resolution.

2. The signal processing device of claim 1, wherein the OSD processor controls change amounts of the luminance and the transparency of the upscaled OSD having the second resolution to further increase as a difference between the first resolution and the second resolution increases.

3. The signal processing device of claim 1, wherein the OSD processor is configured to increase the transparency of the upscaled OSD having the second resolution as the luminance of the image increases and decrease the transparency of the upscaled OSD having the second resolution as the luminance of the image decreases.

4. The signal processing device of claim 1, wherein the OSD processor is configured to increase sharpness of the transparency of the upscaled OSD having the second resolution.

5. The signal processing device of claim 1, wherein the OSD processor is configured to increase the luminance and sharpness of the transparency of the upscaled OSD having the second resolution.

6. The signal processing device of claim 5, wherein the OSD processor is configured to increase change amounts of the luminance and the sharpness of the transparency of the upscaled OSD having the second resolution as the luminance of the image increases and decrease the change amounts of the luminance and the sharpness of the transparency of the upscaled OSD having the second resolution as the luminance of the image decreases.

7. The signal processing device of claim 1, wherein the OSD processor outputs the upscaled OSD having the second resolution, in which a color is further adjusted.

8. The signal processing device of claim 7, wherein the OSD processor controls a level of the color of the upscaled OSD having the second resolution to be greater than a level of the color of the OSD having the first resolution after upscaling the OSD having the first resolution to the second resolution.

9. The signal processing device of claim 1, wherein the signal processor includes
a first resolution processor configured to change the luminance of the OSD having the first resolution to the luminance of the upscaled OSD having the second resolution,
a second resolution processor configured to change the transparency of the OSD having the first resolution to the transparency of the upscaled OSD having the second resolution, and
a third resolution processor configured to change a color of the OSD having the first resolution to the color of the upscaled OSD having the second resolution.

10. A signal processing device comprising:
an on screen display (OSD) processor configured to upscale an OSD having a first resolution to a second resolution greater than the first resolution; and
a synthesizer configured to synthesize at least a part of an image having the second resolution and the upscaled OSD having the second resolution,
wherein the OSD processor outputs the upscaled OSD having the second resolution, in which luminance and transparency are adjusted, and
wherein the signal processor includes
a learning processor configured to change the luminance of the OSD having the first resolution to the luminance of the upscaled OSD having the second resolution, and change the transparency of the OSD having the first resolution to the transparency of the upscaled OSD having the second resolution, based on learning a deep neural network, and
a resolution processor configured to change the color of the OSD having the first resolution to the color of the upscaled OSD having the second resolution.

11. A signal processing device comprising:
an on screen display (OSD) processor configured to upscale an OSD having a first resolution to a second resolution greater than the first resolution; and
a synthesizer configured to synthesize at least a part of an image having the second resolution and the upscaled OSD having the second resolution,
wherein the OSD processor outputs the upscaled OSD having the second resolution, in which a blending ratio of the image and the OSD, and luminance are adjusted.

12. The signal processing device of claim 11, wherein the OSD processor controls the luminance and the blending ratio of the upscaled OSD having the second resolution to be greater than the luminance and the blending ratio of the OSD having the first resolution after upscaling the OSD having the first resolution to the second resolution.

13. The signal processing device of claim 11, wherein the OSD processor is configured to increase change amounts of the luminance and the blending ratio of the upscaled OSD having the second resolution as a difference between the first resolution and the second resolution increases.

14. The signal processing device of claim 11, wherein the OSD processor is configured to increase the blending ratio of the upscaled OSD having the second resolution as the luminance of the image increases and decrease the blending ratio of the upscaled OSD having the second resolution as the luminance of the image decreases.

15. The signal processing device of claim 11, wherein the OSD processor is configured to increase sharpness of the blending ratio of the upscaled OSD having the second resolution.

16. The signal processing device of claim 11, wherein the OSD processor is configured to increase change amounts of the luminance and sharpness of the blending ratio of the upscaled OSD having the second resolution as the luminance of the image increases and decrease the change amounts of the luminance and the sharpness of the blending ratio of the upscaled OSD having the second resolution as the luminance of the image decreases.

17. The signal processing device of claim 11, wherein the OSD processor outputs the upscaled OSD having the second resolution, in which a color is further adjusted.

18. The signal processing device of claim 17, wherein the OSD processor controls a level of the color of the upscaled OSD having the second resolution to be greater than a level of the color of the OSD having the first resolution after upscaling the OSD having the first resolution to the second resolution.

* * * * *